United States Patent
He

(10) Patent No.: US 12,112,677 B2
(45) Date of Patent: Oct. 8, 2024

(54) DRIVE CIRCUIT

(71) Applicant: TCL CHINA STAR OPTOELECTRONICS TECHNOLOGY CO., LTD., Guangdong (CN)

(72) Inventor: Jhenwei He, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/594,043

(22) PCT Filed: Sep. 14, 2021

(86) PCT No.: PCT/CN2021/118096
§ 371 (c)(1),
(2) Date: Sep. 30, 2021

(87) PCT Pub. No.: WO2023/029081
PCT Pub. Date: Mar. 9, 2023

(65) Prior Publication Data
US 2024/0046841 A1  Feb. 8, 2024

(30) Foreign Application Priority Data
Sep. 2, 2021 (CN) .......................... 202111027873.8

(51) Int. Cl.
*G09G 3/20* (2006.01)

(52) U.S. Cl.
CPC ... *G09G 3/2018* (2013.01); *G09G 2320/0247* (2013.01); *G09G 2320/028* (2013.01)

(58) Field of Classification Search
CPC ......... G09G 3/2018; G09G 2320/0247; G09G 2320/028; G09G 2320/0271;
(Continued)

(56) References Cited

U.S. PATENT DOCUMENTS 11,322,077 B1 * 5/2022 Chun .................... G09G 3/3208
2008/0165106 A1 * 7/2008 Park ..................... G09G 3/2022
345/89

(Continued)

FOREIGN PATENT DOCUMENTS

CN  109754762 A  5/2019
CN  110751933 A  2/2020
(Continued)

OTHER PUBLICATIONS

International Search Report in International application No. PCT/CN2021/118096, mailed on Jun. 1, 2022.
(Continued)

*Primary Examiner* — Amr A Awad
*Assistant Examiner* — Aaron Midkiff

(57) ABSTRACT

The present application discloses a drive circuit. The drive circuit includes: a first module, configured to generate image data; and a second module, configured to set a state value corresponding to the next image data based on a frame refresh rate corresponding to the current image data, a state value corresponding to the current image data and a state value corresponding to the previous image data.

20 Claims, 2 Drawing Sheets

(58) Field of Classification Search
CPC ... G09G 2320/0276; G09G 2320/0673; G09G 2340/0435; G09G 2340/16; G09G 3/20; G09G 2300/0465; G09G 2340/0407; G09G 2340/0457; Y02D 10/00
See application file for complete search history.

(56) References Cited

U.S. PATENT DOCUMENTS

| | | | |
|---|---|---|---|
| 2015/0103105 A1 | 4/2015 | Kim et al. | |
| 2020/0302893 A1* | 9/2020 | Lin | G09G 5/10 |
| 2022/0122545 A1* | 4/2022 | Hong | G09G 3/3233 |

FOREIGN PATENT DOCUMENTS

| | | | |
|---|---|---|---|
| CN | 111883070 A | 11/2020 | |
| CN | 112927658 A | 6/2021 | |
| CN | 113160734 A | 7/2021 | |
| CN | 113270074 A | 8/2021 | |

OTHER PUBLICATIONS

Written Opinion of the International Search Authority in International application No. PCT/CN2021/118096, mailed on Jun. 1, 2022.

* cited by examiner

DRIVE CIRCUIT

TECHNICAL FIELD

The present application relates to display technologies, and more particularly, to a drive circuit.

BACKGROUND

The resolution of a display device is gradually increased, and is currently above 8K (7680×4320). Under a condition that the size of a display panel remains unchanged, the increase in resolution reduces the aperture ratio, thereby reducing transmittance of the display panel. Therefore, an original viewing angle improvement scheme, an 8-domain pixel architecture design, cannot be applied in a product with a higher resolution due to a loss of transmittance, and is replaced with a 4-domain pixel architecture, which, however, also leads to deterioration of viewing angle characteristics, and thus viewing angle compensation is required to improve viewing angle characteristics.

An existing viewing angle improvement method generally distinguishes pixels in an effective display region of the display panel into two states, H and L. If H and L are simply separated spatially, a relatively obvious graininess is produced. This conflicts with requirements of high definition. A time-domain viewing angle improvement scheme may eliminate the graininess, but because of a relatively long liquid crystal reaction time, it takes at least twice the display frame time of a native display panel to maintain the H and L states so as to effectively improve the viewing angle. That is, to improve the viewing angle in a time-domain manner, at least two frames need to be repeated. However, in a mode of a variable refresh rate, improving the viewing angle in the time-domain manner produces obvious flicker.

SUMMARY

The present application provides a drive circuit to improve a viewing angle in a time-domain manner without flickering.

According to a first aspect, the present application provides a drive circuit, including:
 a first module, configured to generate image data; and
 a second module, configured to set a state value corresponding to the next image data based on a frame refresh rate corresponding to the current image data, a state value corresponding to the current image data and a state value corresponding to the previous image data.

In the drive circuit according to the present application, the second module includes a calculation unit, a comparison unit and a setting unit; and
 the calculation unit is configured to calculate the frame refresh rate corresponding to the current image data based on the current image data; the comparison unit is configured to compare the frame refresh rate corresponding to the current image data with a preset frequency threshold, and compare the state value corresponding to the previous image data with the state value corresponding to the current image data to obtain a comparison result; and the setting unit is configured to set the state value corresponding to the next image data based on the comparison result.

In the drive circuit according to the present application, the image data includes valid image data and black frame insertion data, where the valid image data corresponding to each image data has the same length, and the frame refresh rate corresponding to the image data is obtained based on a length of the black frame insertion data corresponding to the image data.

In the drive circuit according to the present application, when the frame refresh rate corresponding to the current image data is greater than the preset frequency threshold, and the state value corresponding to the previous image data is equal to the state value corresponding to the current image data, a first comparison result is obtained; and the setting unit sets the state value corresponding to the next image data based on the first comparison result.

In the drive circuit according to the present application, the setting unit switches the state value corresponding to the next image data to be unequal to the state value corresponding to the current image data based on the first comparison result.

In the drive circuit according to the present application, when the frame refresh rate corresponding to the current image data is greater than the preset frequency threshold, and the state value corresponding to the previous image data is unequal to the state value corresponding to the current image data, a second comparison result is obtained; and the setting unit sets the state value corresponding to the next image data based on the second comparison result.

In the drive circuit according to the present application, the setting unit switches the state value corresponding to the next image data to be equal to the state value corresponding to the current image data based on the second comparison result.

In the drive circuit according to the present application, when the frame refresh rate corresponding to the current image data is less than the preset frequency threshold, a third comparison result is obtained; and the setting unit sets the state value corresponding to the next image data based on the third comparison result.

In the drive circuit according to the present application, the setting unit switches the state value corresponding to the next image data to be unequal to the state value corresponding to the current image data based on the third comparison result.

In the drive circuit according to the present application, if the current image data is first-frame image data and the next image data is second-frame image data, the second module is further configured to set a state value corresponding to the second-frame image data based on a frame refresh rate corresponding to the second-frame image data and a state value corresponding to the first-frame image data.

In the drive circuit according to the present application, if the frame refresh rate corresponding to the second-frame image data is greater than the preset frequency threshold, the state value corresponding to the second-frame image data is set to be equal to the state value corresponding to the first-frame image data.

In the drive circuit according to the present application, if the frame refresh rate corresponding to the second-frame image data is less than the preset frequency threshold, the state value corresponding to the second-frame image data is set to be unequal to the state value corresponding to the first-frame image data.

According to a second aspect, the present application further provides a drive circuit, including:
 a first module, configured to generate image data; and
 a second module, configured to set a state value corresponding to the next image data based on a frame refresh rate corresponding to the current image data, a state value corresponding to the current image data and a state value corresponding to the previous image data;

the second module includes a calculation unit, a comparison unit and a setting unit;

the calculation unit is configured to calculate the frame refresh rate corresponding to the current image data based on the current image data; the comparison unit is configured to compare the frame refresh rate corresponding to the current image data with a preset frequency threshold, and compare the state value corresponding to the previous image data with the state value corresponding to the current image data to obtain a comparison result; and the setting unit is configured to set the state value corresponding to the next image data based on the comparison result; and if the current image data is first-frame image data and the next image data is second-frame image data, the second module is further configured to set a state value corresponding to the second-frame image data based on a frame refresh rate corresponding to the second-frame image data and a state value corresponding to the first-frame image data.

In the drive circuit according to the present application, the image data includes valid image data and black frame insertion data, where the valid image data corresponding to each image data has the same length, and the frame refresh rate corresponding to the image data is obtained based on a length of the black frame insertion data corresponding to the image data.

In the drive circuit according to the present application, when the frame refresh rate corresponding to the current image data is greater than the preset frequency threshold, and the state value corresponding to the previous image data is equal to the state value corresponding to the current image data, a first comparison result is obtained; and the setting unit sets the state value corresponding to the next image data based on the first comparison result.

In the drive circuit according to the present application, the setting unit switches the state value corresponding to the next image data to be unequal to the state value corresponding to the current image data based on the first comparison result.

In the drive circuit according to the present application, when the frame refresh rate corresponding to the current image data is greater than the preset frequency threshold, and the state value corresponding to the previous image data is unequal to the state value corresponding to the current image data, a second comparison result is obtained; and the setting unit sets the state value corresponding to the next image data based on the second comparison result.

In the drive circuit according to the present application, the setting unit switches the state value corresponding to the next image data to be equal to the state value corresponding to the current image data based on the second comparison result.

In the drive circuit according to the present application, when the frame refresh rate corresponding to the current image data is less than the preset frequency threshold, a third comparison result is obtained; and the setting unit sets the state value corresponding to the next image data based on the third comparison result.

In the drive circuit according to the present application, the setting unit switches the state value corresponding to the next image data to be unequal to the state value corresponding to the current image data based on the third comparison result.

In the drive circuit according to the present application, one second module is added, and the second module is configured to set a state value corresponding to the next image data based on a frame refresh rate corresponding to the current image data, a state value corresponding to the current image data and a state value corresponding to the previous image data, so that the frame refresh rate corresponding to the current image data can be automatically determined, and the state value corresponding to the next image data is determined, thereby preventing flickering.

BRIEF DESCRIPTION OF DRAWINGS

To explain the technical solutions of the embodiments of the present application more clearly, the following briefly describes the accompanying drawings required in the description of the embodiments. Apparently, the accompanying drawings in the following description show only some embodiments of the present application, and a person skilled in the art may still derive other accompanying drawings from the accompanying drawings without creative efforts.

DESCRIPTION OF EMBODIMENTS

The following clearly and completely describes the technical solutions in the embodiments of the present application with reference to accompanying drawings in the embodiments of the present application. Apparently, the described embodiments are merely some rather than all of the embodiments of the present application. All other embodiments obtained by a person skilled in the art based on the embodiments of the present application without creative efforts shall fall within the protection scope of the present application.

It should be understood that the specific implementations described herein are only used to illustrate and explain the present application, and are not used to limit the present application. The terms "comprising", "having" and any variation thereof in the claims of the present application and in the specification are intended to cover non-exclusive inclusions.

An embodiment of the present application provides a drive circuit. It should be noted that an existing viewing angle improvement method is usually implemented by using a time-domain viewing angle improvement scheme. The time-domain viewing angle improvement scheme can eliminate the graininess, but because of a relatively long liquid crystal reaction time, it takes at least twice the display frame time of a native display panel to effectively improve the viewing angle. That is, to improve the viewing angle in a time-domain manner, at least two frames need to be repeated. The embodiment of the present application can improve a viewing angle in a time-domain manner without flickering. Details are described below. The order of description in the following embodiments is not intended to limit the preferred order of the embodiments.

Figure 1:
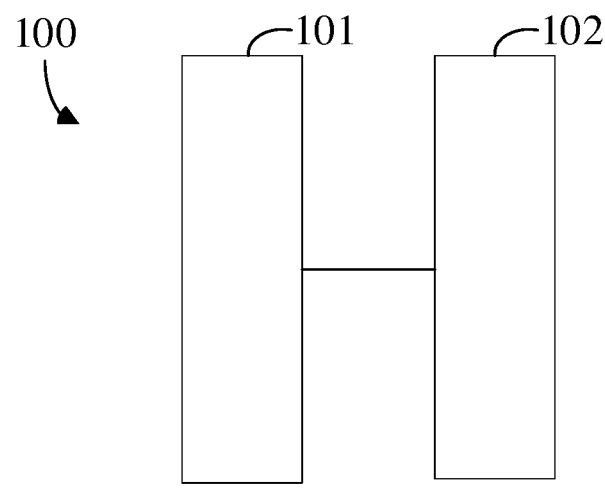
FIG. 1 is a schematic structural diagram of a drive circuit according to an embodiment of the present application.

Referring to FIG. 1, FIG. 1 is a schematic structural diagram of a drive circuit according to an embodiment of the present application. As shown in FIG. 1, the drive circuit 100 according to the embodiment of the present application includes a first module 101 and a second module 102. The first module 101 is connected to the second module 102. The first module 101 is configured to generate image data. The second module 102 is configured to set a state value corresponding to the next image data based on a frame refresh rate corresponding to the current image data, a state value corresponding to the current image data and a state value corresponding to the previous image data. It can be understood that, in the embodiment of the present application, one second module 102 is added, and the second module 102 is configured to set a state value corresponding to the next image data based on a frame refresh rate corresponding to the current image data, a state value corresponding to the current image data and a state value corresponding to the previous image data, so that the frame refresh rate corresponding to the current image data can be automatically determined, and the state value corresponding to the next image data is determined, thereby preventing flickering.

Figure 2:
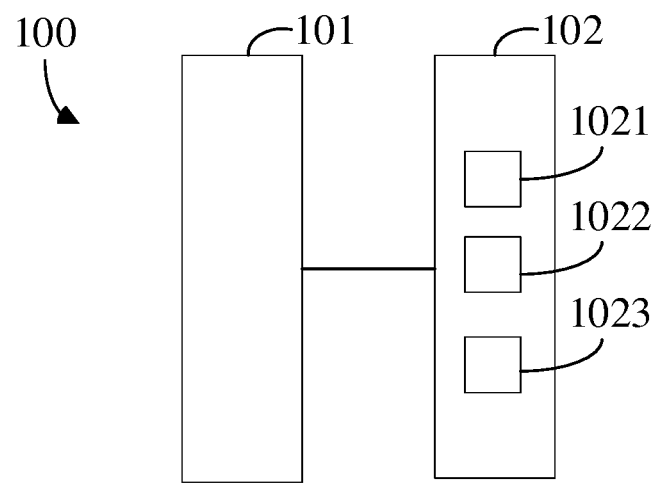
FIG. 2 is a specific schematic structural diagram of a drive circuit according to an embodiment of the present application.

Referring to FIG. 2, FIG. 2 is a specific schematic structural diagram of a drive circuit according to an embodiment of the present application. As shown in FIG. 1 and FIG. 2, the second module 102 in the drive circuit 100 according to the embodiment of the present application includes a calculation unit 1021, a comparison unit 1022 and a setting unit 1023. The calculation unit 1021 is configured to calculate the frame refresh rate corresponding to the current image data based on the current image data. The comparison unit 1022 is configured to compare the frame refresh rate corresponding to the current image data with a preset frequency threshold, and compare the state value corresponding to the previous image data with the state value corresponding to the current image data to obtain a comparison result. The setting unit 1023 is configured to set the state value corresponding to the next image data based on the comparison result.

Figure 3:
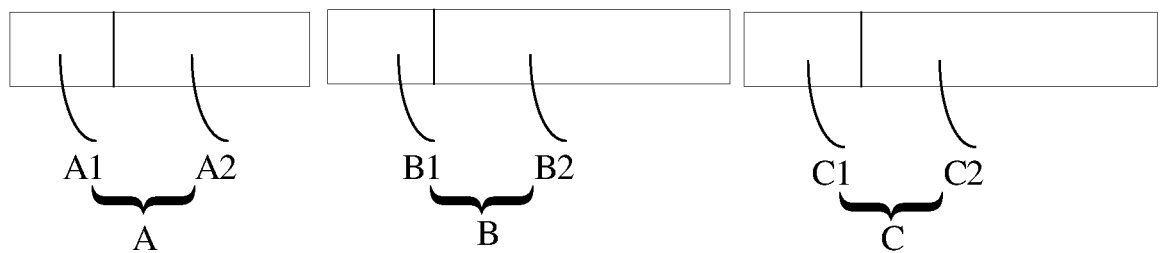
FIG. 3 is a schematic explanatory diagram of image data of a drive circuit according to an embodiment of the present application.

It can be understood that, referring to FIG. 3, FIG. 3 is a schematic explanatory diagram of image data of a drive circuit according to an embodiment of the present application. As shown in FIG. 3, the image data includes valid image data and black frame insertion data. The valid image data corresponding to each image data has the same length, and the frame refresh rate corresponding to the image data is obtained based on a length of the black frame insertion data corresponding to the image data.

For example, the first module generates first image data A, second image data B and third image data C. The first image data A includes first valid image data A1 and first black frame insertion data A2, the second image data B includes second valid image data B1 and second black frame insertion data B2, and the third image data C includes third valid image data C1 and third black frame insertion data C2. The first valid image data A1, the second valid image data B1 and the third valid image data C1 have the same length. The first module 101 calculates a rendering time of each image data to modify the black frame insertion data to achieve the effect of changing the frame refresh rate at any time. This also means that the frame refresh rate of the next image data cannot be learned in advance, so that a time-domain V switching mode cannot be fixed in a mode of arbitrary switching between high and low frequencies.

That is, since the first valid image data A1, the second valid image data B1 and the third valid image data C1 have the same length, the frame refresh rate corresponding to the first image data A may be obtained based on the length of the first black frame insertion data A2; the frame refresh rate corresponding to the second image data B may be obtained based on the length of the second black frame insertion data B2; and the frame refresh rate corresponding to the third image data C may be obtained based on the length of the third black frame insertion data C2.

In the embodiment of the present application, when the frame refresh rate corresponding to the current image data is greater than the preset frequency threshold, and the state value corresponding to the previous image data is equal to the state value corresponding to the current image data, a first comparison result is obtained. The setting unit sets the state value corresponding to the next image data based on the first comparison result. Specifically, the setting unit switches the state value corresponding to the next image data to be unequal to the state value corresponding to the current image data based on the first comparison result.

For example, as shown in FIG. 2 and FIG. 3, the first image data A is the previous image data, the second image data B is the current image data, and the third image data C is the next image data. When the frame refresh rate corresponding to the second image data B is greater than the preset frequency threshold, and the state value corresponding to the first image data A is equal to the state value corresponding to the second image data B, a first comparison result is obtained. The setting unit 1023 sets the state value corresponding to the third image data C based on the first comparison result. Specifically, the setting unit 1023 switches the state value corresponding to the third image data C to be unequal to the state value corresponding to the second image data B based on the first comparison result.

In the embodiment of the present application, when the frame refresh rate corresponding to the current image data is greater than the preset frequency threshold, and the state value corresponding to the previous image data is unequal to the state value corresponding to the current image data, a second comparison result is obtained. The setting unit sets the state value corresponding to the next image data based on the second comparison result. Specifically, the setting unit switches the state value corresponding to the next image data to be equal to the state value corresponding to the current image data based on the second comparison result.

For example, as shown in FIG. 2 and FIG. 3, the first image data A is the previous image data, the second image data B is the current image data, and the third image data C is the next image data. When the frame refresh rate corresponding to the second image data B is greater than the preset frequency threshold, and the state value corresponding to the first image data A is unequal to the state value corresponding to the second image data B, a second comparison result is obtained. The setting unit 1023 sets the state value corresponding to the third image data C based on the second comparison result. Specifically, the setting unit 1023 switches the state value corresponding to the third image data C to be equal to the state value corresponding to the second image data B based on the second comparison result.

In the embodiment of the present application, when the frame refresh rate corresponding to the current image data is less than the preset frequency threshold, a third comparison result is obtained. The setting unit sets the state value corresponding to the next image data based on the third comparison result. Specifically, the setting unit switches the state value corresponding to the next image data to be unequal to the state value corresponding to the current image data based on the third comparison result.

For example, as shown in FIG. 2 and FIG. 3, the first image data A is the previous image data, the second image data B is the current image data, and the third image data C is the next image data. When the frame refresh rate corresponding to the second image data B is less than the preset frequency threshold, a third comparison result is obtained. The setting unit 1023 sets the state value corresponding to the third image data C based on the third comparison result. Specifically, the setting unit 1023 switches the state value corresponding to the third image data C to be unequal to the state value corresponding to the second image data B based on the third comparison result.

Figure 4:
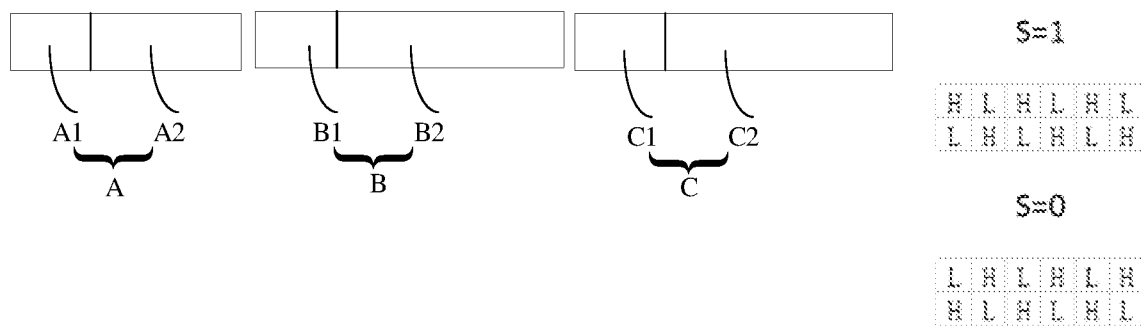
FIG. 4 is another schematic explanatory diagram of image data of a drive circuit according to an embodiment of the present application.

Further, referring to FIG. 4, FIG. 4 is another schematic explanatory diagram of image data of a drive circuit according to an embodiment of the present application. As shown in FIG. 2 and FIG. 4, in the embodiment of the present application, the state value corresponding to the image data may be "0" or "1", where the state "0" and the state "1" both indicate high/low state distribution of each pixel. When the state value corresponding to the image data is "1", the high/low state distribution of each pixel is as shown in the figure; and when the state value corresponding to the image data is "0", the high/low state of each pixel is as shown in the figure.

Specifically, as shown in FIG. 4, the first image data A is the previous image data, the second image data B is the current image data, and the third image data C is the next image data. When the state value corresponding to the first image data A is "0", the frame refresh rate corresponding to the second image data B is greater than the preset frequency threshold, and when the state value corresponding to the second image data B is "0", a first comparison result is obtained. The setting unit 1023 sets the state value corresponding to the third image data C based on the first comparison result. Specifically, the setting unit 1023 switches the state value corresponding to the third image data C to "1" based on the first comparison result.

When the state value corresponding to the first image data A is "0", the frame refresh rate corresponding to the second image data B is greater than the preset frequency threshold, and when the state value corresponding to the second image data B is "1", a second comparison result is obtained. The setting unit 1023 sets the state value corresponding to the third image data C based on the second comparison result. Specifically, the setting unit 1023 switches the state value corresponding to the third image data C to "0" based on the second comparison result.

When the state value corresponding to the first image data A is "0", the frame refresh rate corresponding to the second image data B is less than the preset frequency threshold, and when the state value corresponding to the second image data B is "0", a third comparison result is obtained. The setting unit 1023 sets the state value corresponding to the third image data C based on the third comparison result. Specifically, the setting unit 1023 switches the state value corresponding to the third image data C to "1" based on the second comparison result.

When the state value corresponding to the first image data A is "0", the frame refresh rate corresponding to the second image data B is less than the preset frequency threshold, and when the state value corresponding to the second image data is "1", a third comparison result is obtained. The setting unit 1023 sets the state value corresponding to the third image data C based on the third comparison result. Specifically, the setting unit 1023 switches the state value corresponding to the third image data C to "0" based on the second comparison result.

In the embodiment of the present application, if the current image data is first-frame image data and the next image data is second-frame image data, the second module is further configured to set a state value corresponding to the second-frame image data based on a frame refresh rate corresponding to the second-frame image data and a state value corresponding to the first-frame image data. If the frame refresh rate corresponding to the second-frame image data is greater than the preset frequency threshold, the state value corresponding to the second-frame image data is set to be equal to the state value corresponding to the first-frame image data. If the frame refresh rate corresponding to the second-frame image data is less than the preset frequency threshold, the state value corresponding to the second-frame image data is set to be unequal to the state value corresponding to the first-frame image data.

Figure 5:
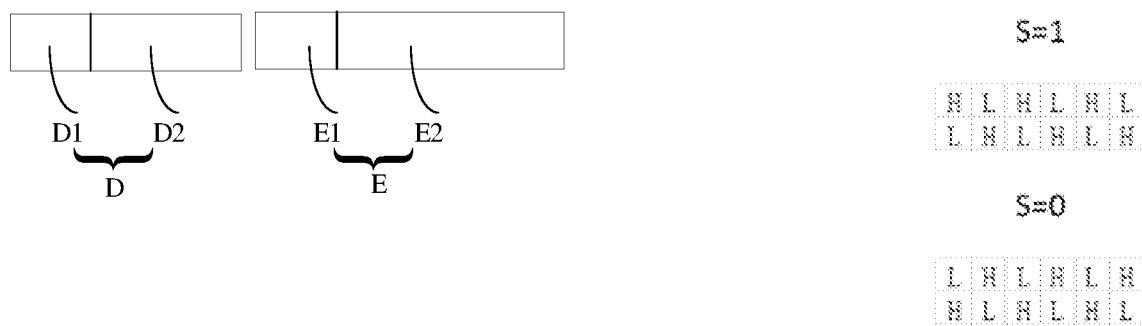
FIG. 5 is a schematic explanatory diagram of image data of still another drive circuit according to an embodiment of the present application.

For example, referring to FIG. 5, FIG. 5 is a schematic explanatory diagram of image data of still another drive circuit according to an embodiment of the present application. As shown in FIG. 2 and FIG. 5, in the embodiment of the present application, the state value corresponding to the image data may be "0" or "1", where the state "0" and the state "1" both indicate high/low state distribution of each pixel. When the state value corresponding to the image data is "1", the high/low state distribution of each pixel is as shown in the figure; and when the state value corresponding to the image data is "0", the high/low state of each pixel is as shown in the figure.

Specifically, as shown in FIG. 5, first-frame image data D is the current image data, and second-frame image data is next image data E. The state value corresponding to the first-frame image data D is "0", and if a frame refresh rate corresponding to second-frame image data E is greater than the preset frequency threshold, the state value corresponding to the second-frame image data E is set to "0". If the frame refresh rate corresponding to the second-frame image data E is less than the preset frequency threshold, the state value corresponding to the second-frame image data E is set to "1".

In the drive circuit according to the embodiments of the present application, one second module is added, and the second module is configured to set a state value corresponding to the next image data based on a frame refresh rate corresponding to the current image data, a state value corresponding to the current image data and a state value corresponding to the previous image data, so that the frame refresh rate corresponding to the current image data can be automatically determined, and the state value corresponding to the next image data is determined, thereby preventing flickering.

In the drive circuit according to the embodiments of the present application, specific examples are applied herein to explain the principle and implementations of the present application, and the above-mentioned description of the embodiments is only intended to help understand the method and the core idea of the present application. In addition, for a person skilled in the art, there may be modifications in the specific implementations and application scope based on the idea of the present application. In conclusion, the content of the present specification should not be construed as a limitation to the present application.

What is claimed is:
1. A method, comprising:
    generating image data; and
    setting a state value corresponding to the next image data
        based on a frame refresh rate corresponding to current image data, a state value corresponding to the current image data and a state value corresponding to previous image data;

wherein setting a state value corresponding to the next image data based on a frame refresh rate corresponding to current image data, a state value corresponding to the current image data and a state value corresponding to previous image data comprises:

calculating the frame refresh rate corresponding to the current image data based on the current image data;

comparing the frame refresh rate corresponding to the current image data with a preset frequency threshold, and comparing the state value corresponding to the previous image data with the state value corresponding to the current image data to obtain a comparison result;

setting the state value corresponding to the next image data based on the comparison result;

wherein the frame refresh rate corresponding to the current image data is greater than the preset frequency threshold, and the state value corresponding to the previous image data is equal to the state value corresponding to the current image data, a first comparison result is obtained; setting the state value corresponding to the next image data based on the comparison result comprises:

switching the state value corresponding to the next image data to be unequal to the state value corresponding to the current image data based on the first comparison result.

2. The method according to claim 1, wherein the image data comprises valid image data and black frame insertion data, wherein the valid image data corresponding to each image data have a same length, and the frame refresh rate corresponding to the image data is obtained based on a length of the black frame insertion data corresponding to the image data.

3. The method according to claim 1, wherein the frame refresh rate corresponding to the current image data is greater than the preset frequency threshold, and the state value corresponding to the previous image data is unequal to the state value corresponding to the current image data, a second comparison result is obtained, setting the state value corresponding to the next image data based on the comparison result comprises:

setting the state value corresponding to the next image data based on the second comparison result.

4. The method according to claim 3, wherein setting the state value corresponding to the next image data based on the second comparison result comprises:

switching the state value corresponding to the next image data to be equal to the state value corresponding to the current image data based on the second comparison result.

5. The method according to claim 1, wherein the frame refresh rate corresponding to the current image data is less than the preset frequency threshold, a third comparison result is obtained, setting the state value corresponding to the next image data based on the comparison result comprises:

setting the state value corresponding to the next image data based on the third comparison result.

6. The method according to claim 5, wherein setting the state value corresponding to the next image data based on the third comparison result comprises:

switching the state value corresponding to the next image data to be unequal to the state value corresponding to the current image data based on the third comparison result.

7. The method according to claim 1, wherein the current image data is first-frame image data, the next image data is second-frame image data, setting a state value corresponding to the next image data based on a frame refresh rate corresponding to current image data, a state value corresponding to the current image data and a state value corresponding to previous image data further comprises:

setting a state value corresponding to the second-frame image data based on a frame refresh rate corresponding to the second-frame image data and a state value corresponding to the first-frame image data.

8. The method according to claim 7, wherein the frame refresh rate corresponding to the second-frame image data is greater than the preset frequency threshold, the state value corresponding to the second-frame image data is set to be equal to the state value corresponding to the first-frame image data.

9. The method according to claim 7, wherein the frame refresh rate corresponding to the second-frame image data is less than the preset frequency threshold, the state value corresponding to the second-frame image data is set to be unequal to the state value corresponding to the first-frame image data.

10. A method, comprising:

generating image data; and setting a state value corresponding to the next image data based on a frame refresh rate corresponding to current image data, a state value corresponding to the current image data and a state value corresponding to previous image data, wherein setting a state value corresponding to the next image data based on a frame refresh rate corresponding to current image data, a state value corresponding to the current image data and a state value corresponding to previous image data comprises:

calculating the frame refresh rate corresponding to the current image data based on the current image data;

comparing the frame refresh rate corresponding to the current image data with a preset frequency threshold, and comparing the state value corresponding to the previous image data with the state value corresponding to the current image data to obtain a comparison result;

setting the state value corresponding to the next image data based on the comparison result; and wherein the current image data is first-frame image data, the next image data is second-frame image data, setting a state value corresponding to the next image data based on a frame refresh rate corresponding to current image data, a state value corresponding to the current image data and a state value corresponding to previous image data further comprises:

setting a state value corresponding to the second-frame image data based on a frame refresh rate corresponding to the second-frame image data and a state value corresponding to the first-frame image data;

wherein the frame refresh rate corresponding to the current image data is greater than the preset frequency threshold, and the state value corresponding to the previous image data is equal to the state value corresponding to the current image data, a first comparison result is obtained: setting the state value corresponding to the next image data based on the comparison result comprises: switching the state value corresponding to the next image data to be unequal to the state value corresponding to the current image data based on the first comparison result.

11. The method according to claim 10, wherein the image data comprises valid image data and black frame insertion data, wherein the valid image data corresponding to each image data have a same length, and the frame refresh rate corresponding to the image data is obtained based on a length of the black frame insertion data corresponding to the image data.

12. The method according to claim 10, wherein the frame refresh rate corresponding to the current image data is greater than the preset frequency threshold, and the state value corresponding to the previous image data is unequal to the state value corresponding to the current image data, a second comparison result is obtained, setting the state value corresponding to the next image data based on the comparison result comprises:
   setting the state value corresponding to the next image data based on the second comparison result.

13. The method according to claim 12, wherein setting the state value corresponding to the next image data based on the second comparison result comprises:
   switching the state value corresponding to the next image data to be equal to the state value corresponding to the current image data based on the second comparison result.

14. The method according to claim 10, wherein the frame refresh rate corresponding to the current image data is less than the preset frequency threshold, a third comparison result is obtained, setting the state value corresponding to the next image data based on the comparison result comprises:
   setting the state value corresponding to the next image data based on the third comparison result.

15. The method according to claim 14, wherein setting the state value corresponding to the next image data based on the third comparison results comprises:
   switching the state value corresponding to the next image data to be unequal to the state value corresponding to the current image data based on the third comparison result.

16. A drive circuit, comprising one or more processors configured to perform operations of:
   generating image data; and
   setting a state value corresponding to the next image data based on a frame refresh rate corresponding to current image data, a state value corresponding to the current image data and a state value corresponding to previous image data;
   wherein setting a state value corresponding to the next image data based on a frame refresh rate corresponding to current image data, a state value corresponding to the current image data and a state value corresponding to previous image data comprises:
   calculating the frame refresh rate corresponding to the current image data based on the current image data;
   comparing the frame refresh rate corresponding to the current image data with a preset frequency threshold, and comparing the state value corresponding to the previous image data with the state value corresponding to the current image data to obtain a comparison result;
   setting the state value corresponding to the next image data based on the comparison result;
   wherein the frame refresh rate corresponding to the current image data is greater than the preset frequency threshold, and the state value corresponding to the previous image data is equal to the state value corresponding to the current image data, a first comparison result is obtained; setting the state value corresponding to the next image data based on the comparison result comprises:
   switching the state value corresponding to the next image data to be unequal to the state value corresponding to the current image data based on the first comparison result.

17. The drive circuit according to claim 16, wherein the image data comprises valid image data and black frame insertion data, wherein the valid image data corresponding to each image data have a same length, and the frame refresh rate corresponding to the image data is obtained based on a length of the black frame insertion data corresponding to the image data.

18. The drive circuit according to claim 16, wherein the frame refresh rate corresponding to the current image data is greater than the preset frequency threshold, and the state value corresponding to the previous image data is unequal to the state value corresponding to the current image data, a second comparison result is obtained, setting the state value corresponding to the next image data based on the comparison result comprises:
   setting the state value corresponding to the next image data based on the second comparison result.

19. The drive circuit according to claim 18, wherein setting the state value corresponding to the next image data based on the second comparison result comprises:
   switching the state value corresponding to the next image data to be equal to the state value corresponding to the current image data based on the second comparison result.

20. The drive circuit according to claim 16, wherein the frame refresh rate corresponding to the current image data is less than the preset frequency threshold, a third comparison result is obtained, setting the state value corresponding to the next image data based on the comparison result comprises:
   setting the state value corresponding to the next image data based on the third comparison result.

* * * * *